United States Patent
Kartalopoulos

(10) Patent No.: US 6,266,333 B1
(45) Date of Patent: Jul. 24, 2001

(54) NETWORK-INDEPENDENT ROUTING OF COMMUNICATION SIGNALS

(75) Inventor: Stamatios V. Kartalopoulos, Annandale, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/089,009

(22) Filed: Jun. 2, 1998

(51) Int. Cl.[7] ............................... H04L 12/28; H04J 3/16
(52) U.S. Cl. ................................ 370/395; 466/907
(58) Field of Search ........................ 370/474, 477, 370/466, 392, 393, 394, 395, 505, 506, 401, 907, 353, 352, 402, 465; 359/158, 159, 114, 147, 154

(56) References Cited

U.S. PATENT DOCUMENTS

| | | | | |
|---|---|---|---|---|
| 5,315,594 | * | 5/1994 | Noser | 370/353 |
| 5,390,174 | * | 2/1995 | Jugel | 370/392 |
| 5,872,780 | * | 2/1999 | Demiray et al. | 370/907 |
| 6,011,802 | * | 1/2000 | Norman | 370/466 |
| 6,041,043 | * | 3/2000 | Denton et al. | 370/395 |

* cited by examiner

Primary Examiner—Alpus H. Hsu
Assistant Examiner—Afsar M. Qureshi
(74) Attorney, Agent, or Firm—Steve Mendelsohn

(57) ABSTRACT

Data signals from two or more different communication networks conforming to one or more different transmission protocols are re-formatted into an internal data format for purposes of routing the data signals. The internal format has one or more fields corresponding to terminated overhead data for storing payload data. In one embodiment, a switching system has a network-independent switch and two or more network-dependent port units. Each port unit is configured to interface with a different communication network and to convert data signals between the transmission protocol of the corresponding communication network and the internal format. The switch receives and routes the data signals in the internal format and transmits the routed data signals back to the appropriate port units for re-formatting for transmission to the corresponding communication networks. The switching system can be configured as the interface between two or more different communication networks, including synchronous networks such as SONET networks and asynchronous network such as ATM and LAN networks.

21 Claims, 3 Drawing Sheets

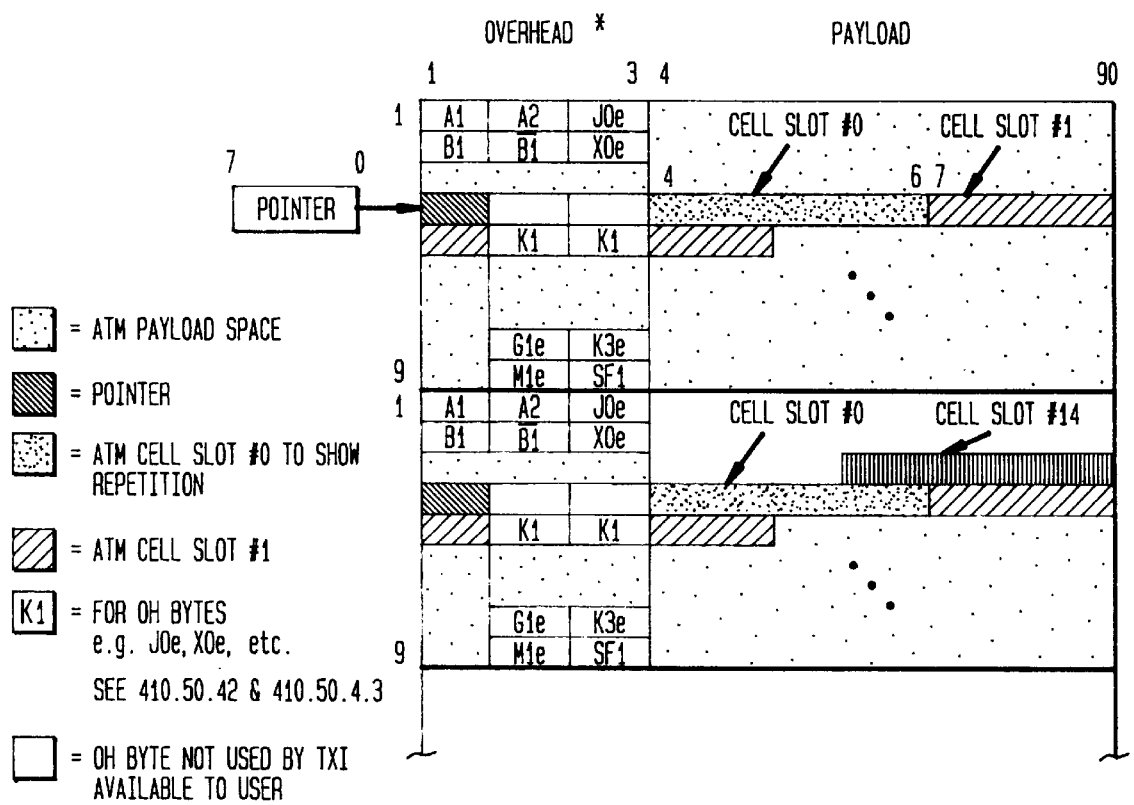

NETWORK-INDEPENDENT ROUTING OF COMMUNICATION SIGNALS

BACKGROUND OF THE INVENTION

1. Field of the Invention

The present invention relates to signal processing, and, in particular, to the routing of signals for synchronous and/or asynchronous communications.

2. Description of the Related Art

In a communication system, different nodes communicate with one another by exchanging signals that conform to a specified transmission protocol known by the nodes. The transmission protocol enables the nodes to decode information or data contained in the signals. Communication systems typically support one of either synchronous or asynchronous communications. In synchronous communications, signals are transmitted in a continuous steady stream in which the signals are received in the same temporal sequence in which they were transmitted. In asynchronous communications, signals are transmitted in discrete, non-steady packets of data that may possibly be received out of order—that is, in a temporal sequence different from that in which the packets were transmitted.

Asynchronous Transfer Mode (ATM) is a particular standard for asynchronous communications. According to the ATM standard, signals are transmitted in ATM packets called cells that contain 53 bytes of data, where, in each cell, the first 5 bytes are reserved for overhead data and the remaining 48 bytes are available for payload data. Overhead data correspond to information used by the nodes and other network components to route the cells and/or reconstruct the streams of communication signals. For example, overhead data may include a source code, a destination code, an error correction code, and other data depending on the type of interface. Payload data correspond to the streams of communication signals being exchanged between the network nodes. For example, in a telephony system, payload data may correspond to the telephone audio signals transmitted from one node to another.

SONET (Synchronous Optical NETwork) is a standard for synchronous communications over optical fiber networks. The SONET standard defines a number of different formats for encoding data for exchange between network nodes. One of these formats is the STS-1 frame in which data are encoded into a matrix consisting of byte-size elements arranged in 9 rows and 90 columns, in which the first 3 columns are reserved for overhead data and the remaining 87 columns are used for both overhead and payload data. Each STS-1 frame is transmitted in 125 microseconds at a fiber data rate referred to as the OC-1 data rate.

Another SONET format is the STS-3 frame in which data are encoded into a matrix consisting of 9 rows and 270 columns, in which the first 9 columns are reserved for overhead data and the remaining 261 columns are used for both overhead and payload data. Each STS-3 frame is transmitted in 125 microseconds at the OC-3 fiber data rate.

Yet another SONET format is the STS-12 frame in which data are encoded into a matrix consisting of 9 rows and 1080 columns, in which the first 36 columns are reserved for overhead data and the remaining 1044 columns are used for both overhead and payload data. Each STS-12 frame is transmitted in 125 microseconds at the OC-12 fiber data rate.

Still another SONET format is the STS-48 frame in which data are encoded into a matrix consisting of 9 rows and 4320 columns, in which the first 144 columns are reserved for overhead data and the remaining 4176 columns are used for both overhead and payload data. Each STS48 frame is transmitted in 125 microseconds at the OC-48 fiber data rate.

The selected data rate dictates which SONET frame format is used. In any case, the data encoded in any of the SONET formats are transmitted sequentially within each row from left to right and row by row from top to bottom.

FIG. 1 shows a single path 100 linking two end nodes 102 (e.g., two telephones) in a conventional communication network, for purposes of demonstrating different types of overhead data. At the center of path 100, is a switch 106 that handles the routing of signals between end nodes 102. In addition, path 100 has zero, one, or more repeaters 104 between switch 106 and each end node 102 that act as amplifiers for the transmitted signals.

Signals transmitted over a communication network having paths like path 100 of FIG. 1 may contain three different types of overhead data: path data, line data, and section data. Path data refers to overhead data communicating information between end nodes 102 of a communication network. Line data refers to overhead data communicating information between an end node 102 and a switch 106 internal to the communication network. Section data refers to overhead data communicating information between an end node 102 and a repeater 104 internal to the communication network, between two repeaters 104, or between a repeater 104 and a switch 106. Overhead data in each of the different SONET formats includes path data, line data, and section data.

It is often desirable to connect two different types of communication networks together to enable nodes of each network to communicate with nodes of the other. In this case, data formatted for communication over one network must be re-packaged for communication over the other network. The SONET and ATM standards define how to package ATM data for transmission over a SONET synchronous network. In particular, the 53-byte ATM cells are packed into the payload portion of the SONET frames. Such transmissions are referred to as ATM-over-SONET.

For example, for the OC-1 data rate, the 53-byte ATM cells are packed into 86 of the 87 payload columns of each of the 9 rows of each STS-1 frame. Since there are 774 payload bytes in each STS-1 frame, the first STS-1 frame can hold 14 complete ATM cells and the first 32 bytes of a $15^{th}$ ATM cell. The remaining 21 bytes of the $15^{th}$ ATM cell are packed into the initial payload fields of the second STS-1 frame, followed by another 14 complete ATM cells and the first 11 bytes of the 301 ATM cell; and so on. In this way, the ATM cells are efficiently packed into the payload portions of the STS-1 frames.

Similarly, for the STS-3, STS-12, and STS-48 frames, ATM cells are packed into the payload portions with fractions of ATM cells overlapping consecutive frames, as necessary. Because SONET is a synchronous system that requires a steady stream of signals, if cells are not received in time from the ATM network to fill payload fields of the current SONET frame, idle cells containing null data are used to maintain the synchronous flow of signals. For a SONET system with multiple ATM inputs, the different inputs are polled when filling the SONET frames, with each input having a unique identifier so that the SONET system can keep track of which ATM input supplied each ATM cell. Of the ATM cells arrive at a sufficiently high rate, the SONET system may have difficulty keeping up with the ATM data flow.

SUMMARY OF THE INVENTION

The present invention is directed to a switching system that can be configured to enable different communication networks conforming to different transmission protocols to communicate with one another. In one embodiment, the transmission format used by the switching system is based loosely on the conventional SONET frame formats in which overhead and payload data are arranged in matrices having 9 rows and M columns, in which the first N columns are reserved for overhead data and the remaining (M–N) columns are available for payload data. According to the present invention, one or more fields that are reserved for overhead data in the SONET format, but whose data have been terminated, are used for payload data.

For example, when the switching system is connected to an ATM network, portions of one or more ATM cells received from the ATM network are packed into fields, which in the SONET format, are reserved for overhead data. However, since some overhead data are terminated at the interface between the ATM network and the switching system, there is no need to reserve those fields while the data is transmitted through the switching system. When the routed data is reformatted for re-transmission by the switching system, appropriate overhead data is restored as needed. In this way, the switching system makes more efficient use of its available processing bandwidth.

In one embodiment, the present invention is a switching system for communication networks, comprising (a) a network-independent switch, and (b) a plurality of network-dependent port units connected to the switch. Each port unit is adapted to be configured to a corresponding communication network, such that (1) each port unit receives data signals from its corresponding communication network conforming to a transmission protocol of the corresponding communication network, terminates at least some overhead data in the data signals, and re-formats the data signals into an internal format for transmission to and routing by the switch, wherein the internal format has one or more fields corresponding to terminated overhead data for storing payload data, and (2) each port unit receives routed data signals from the switch in the internal format and re-formats the routed data signals for transmission to the corresponding communication network.

In another embodiment, the present invention is a method and apparatus for routing data signals in communication networks. Data signals are received from two or more communication networks, each communication network conforming to a transmission protocol, and at least some overhead data in the data signals is terminated. The data signals are re-formatted into an internal format, wherein the internal format has one or more fields corresponding to terminated overhead data for storing payload data. The data signals are routed in the internal format and the routed data signals are then re-routed for transmission to the communication networks.

BRIEF DESCRIPTION OF THE DRAWINGS

Other aspects, features, and advantages of the present invention will become more fully apparent from the following detailed description, the appended claims, and the accompanying drawings in which:

FIG. 3 shows the internal frame format for the data processed by the switching system of FIG. 2, according to one embodiment of the present invention.

DETAILED DESCRIPTION

Figure 1:
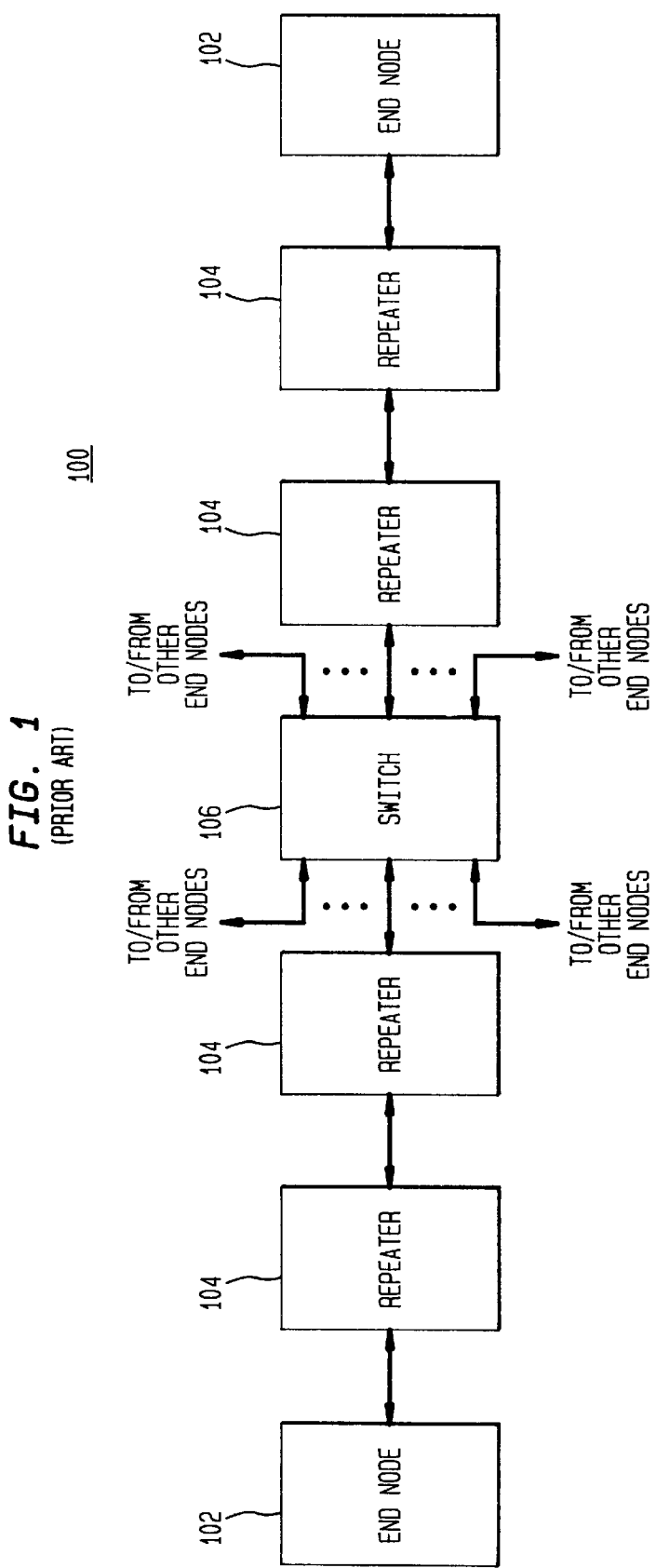
FIG. 1 shows a single path linking two end nodes in a conventional communication network.
Figure 2:
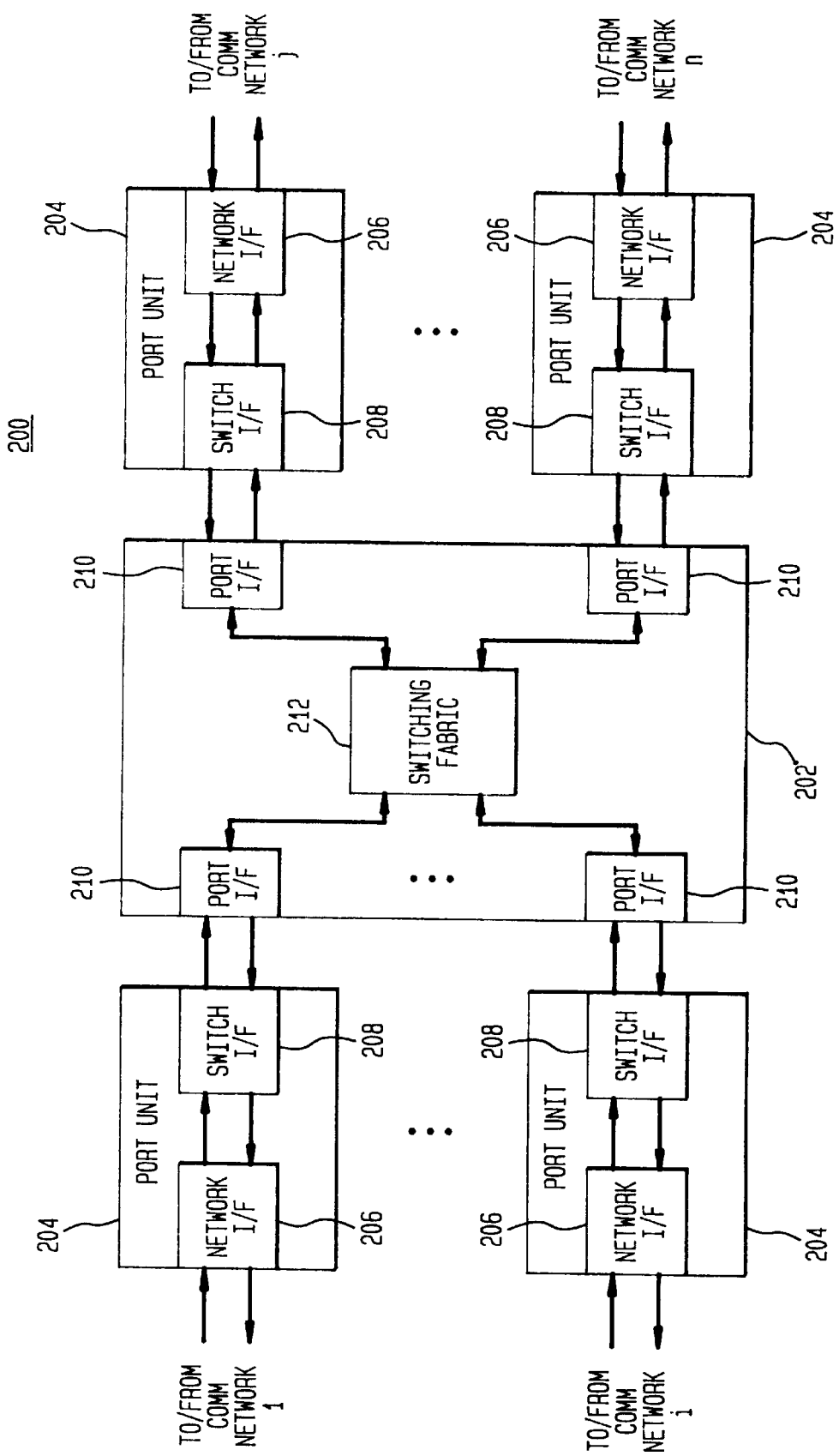
FIG. 2 shows a block diagram of a switching system for communication networks, according to one embodiment of the present invention.

FIG. 2 shows a block diagram of a switching system 200 for communication networks, according to one embodiment of the present invention. Switching system 200 provides a highly flexible architecture that can be configured for use in a wide variety of applications. For example, switching system 200 can be used as a switch internal to a communication network, similar to switch 106 of FIG. 1. Alternatively, switching system 200 can be configured to form the interface between two or more different communication networks conforming to two or more different communication protocols. For example, as described in further detail later on in this specification, switching system 200 can be configured to switch signals between an ATM network and a SONET network.

Switching system 200 comprises network-independent switch 202 and two or more network-dependent port units 204. When switching system 200 is configured to provide the interface between different communication networks, each port unit 204 provides the interface between switch 202 and a particular communication network. In particular, each port unit 204 has a network-specific network interface 206 that handles the transmission and receipt of signals to and from the corresponding communication network, and a high-speed switch interface 208 that handles the transmission and receipt of signals to and from switch 202.

Switch 202 has a high-speed port interface 210 for each port unit 204 that handles the transmission and receipt of signals to and from that port unit 204. Switch 202 also has switching fabric 212, which performs the actual routing of signals for the different communication networks. In general, each communication network corresponding to one of the port units 204 may be independent of every other communication network. As such, switching system 200 can be configured to conform to one or more different network transmission protocols.

According to the present invention, all network-dependent communication signals received by switching system 200 are converted by port units 204 into the same internal frame format for purposes of routing the signals through switching fabric 212. In one embodiment of the present invention, the internal frame format is based on the structure of the conventional SONET frames, but differs in at least one important aspect—at least one of the fields reserved for overhead data according to the SONET frame format is used for payload data.

When a port unit 204 of switching system 200 receives signals from its corresponding communication network, some of the overhead data contained in the received signals are terminated. Overhead data is said to be terminated when the overhead data corresponds to information that is decoded and used by the receiving component to process and route the received signal. After being processed (i.e., routed) by switching fabric 212, the port units 204 add appropriate overhead data back into the routed data before the port units 204 re-transmit the data to their communication networks. As such, there is no need to reserve fields for the terminated overhead data while the data are being routed through switching fabric 212.

FIG. 3 shows the internal frame format for the data processed by switching system 200 of FIG. 2, according to one embodiment of the present invention. Each port unit 204 converts the data received from its corresponding communication network into the internal format of FIG. 3, transmits that data to switching fabric 212, receives data in that same internal format from switching fabric 212, and converts that data back into the format conforming to the communication protocol of its corresponding communication network.

The internal format of FIG. 3 is identical to the STS-1 frame format of the SONET standard, except that, in addition to Columns 4–90, the 12 fields shown in Table I, which are reserved for overhead data in the STS-1 format, are available for storing payload data. Thus, each frame conforming to the internal format of FIG. 3 contains a total of 795 fields available for payload data.

In addition, the field at Row 4, Column 1 is used as a pointer that identifies how many cell slots before the first cell of received data, that is, the number of idle cells of null data before the first cell of real data. This information can be used by the port units to speed up the re-formatting of routed data for re-transmission to the corresponding communication networks.

The internal format of FIG. 3 also provides two additional undefined fields (Row 4, Columns 2–3) that are available to the user, as needed. For example, these two user-defined fields can be used for in-band signal of information between two port units or between the switching fabric and a port unit.

TABLE I

PAYLOAD DATA IN SONET OVERHEAD FIELDS

| ROW | COLUMNS |
|---|---|
| 3 | 1–3 |
| 5 | 1 |
| 6 | 1–3 |
| 7 | 1–3 |
| 8 | 1 |
| 9 | 1 |

When a port unit 204 is configured to interface with an ATM network, the 53-byte ATM cells are packed into the payload fields as shown in FIG. 3, starting with Cell Slot #0 at Row 4, Column 4 (although other locations are also possible). Since the 795 byte-size payload fields correspond to 15 complete 53-byte ATM cells each frame of FIG. 3 can be used to store 15 complete ATM cells. Thus, not only does the internal format of FIG. 3 hold more ATM data than the ATM-over-SONET format dictated by the ATM and SONET standards, but the internal format of FIG. 3 avoids having to split cells between successive frames. Note that, even though each ATM cell has 5 bytes of overhead data, in the internal format of FIG. 3, each entire ATM cell, including its overhead data, is considered to be payload data for purposes of routing ATM cells through switching fabric 212.

Since the internal format of FIG. 3 holds more payload data than the SONET STS-1 format, there is not a one-to-one relation between SONET frames and internal frames, when switching system is configured to one or more SONET networks. However, since the internal frame of FIG. 3 is the same size as a SONET STS-1 frame, switching system 200 can be implemented to operate with some of the same components (e.g., oscillators) as those used for SONET communication equipment.

According embodiments of the present invention, switching system 200 of FIG. 2 can also handle other internal frame formats are based loosely on the other SONET formats (e.g., STS-3, STS-12, and STS-48 ). In each internal formats, one or more fields corresponding to terminated overhead data are used for payload data purposes of routing data through switching fabric 212.

Switching system 200 can be configured to operate with synchronous or asynchronous communication networks that conform to different protocols, including, but not limited to, ATM networks, SONET networks, and local area networks (LANs). Each port unit 204 can be configured independently of each other port unit in switching system 200 as needed to interface with its corresponding communication network. No matter what protocol the data arrives in, the corresponding port unit 204 converts it to the internal format shown in FIG. 3. Similarly, each port unit 204 converts data from the internal format of FIG. 3 back into the appropriate format conforming to the protocol of its corresponding communication network. In this way, switching fabric 212 is isolated from and independent of the actual communication networks to which switching system 200 is configured.

Although the present invention has been described in the context of the internal frame format of FIG. 3, which is based loosely on the SONET STS-1 frame, the present invention can be implemented using other formats. In general, the present invention defines a data format that uses one or more fields corresponding to terminated overhead data to pack payload data more efficiently for transmission. In some embodiments, the transmission may be limited to the internal processing of a particular component, such as routing through switching system 200 of FIG. 2. In other embodiments, the transmissions may include transmission between remotely located components of a communication network.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A switching system for communication networks, comprising:

(a) a network-independent switch; and (b) a plurality of network-dependent port units connected to the switch, wherein each port unit is adapted to be configured to a corresponding communication network, such that:

each port unit receives data signals from its corresponding communication network conforming to a transmission protocol of the corresponding communication network, terminates at least some overhead data in the data signals, and re-formats the data signals into an internal format for transmission to and routing by the switch, wherein the internal format has one or more fields corresponding to terminated overhead data for storing payload data;

each port unit receives routed data signals from the switch in the internal format and re-formats the routed data signals for transmission to the corresponding communication network; and the switching system is configurable such that each communication network corresponding to each different port unit is independent of every other communication network corresponding to every other port unit.

2. The invention of claim 1, wherein the internal format corresponds to a SONET frame format, except that one or more fields corresponding to overhead data in the SONET frame format are used for payload data in the internal format.

3. The invention of claim 1, wherein:

the switching system is configurable such that a first communication network corresponding to a first port unit is a synchronous network and a second communication network corresponding to a second port unit is an asynchronous network, wherein the first communication network is a SONET network and the second communication network is an ATM network;

the internal format corresponds to a SONET frame format, except that one or more fields corresponding to overhead data in the SONET frame format are used for payload data in the internal format, wherein:

the internal format is adapted to store a greater number of complete 53-byte data packets of payload data than the SONET frame format;

the internal format corresponds to a matrix having 9 rows and M columns, wherein the first N columns are used for both overhead data and payload data and the last M–N columns are used for payload data;

at least one field in the first N columns is used as a pointer to identify the number of idle cells of null data before a first cell of real data; and at least one field in the first N columns is user-definable;

the switching system is configurable to function as a switch node internal to a communication network, in which case all of the port units are configured to handle data signals corresponding to a single transmission protocol;

the switching system is configurable to function as an interface between two or more different communication networks conforming to two or more different transmission protocols, in which case each port unit is configured to handle data signals corresponding to the transmission protocol of its corresponding communication network;

each port unit comprises:

(1) a network-dependent interface adapted to be configured to the corresponding communication network to convert between data signals conforming to the transmission protocol of the corresponding communication network and data signals in the internal format; and (2) a port unit interface for transmitting and receiving data signals in the internal format to and from the switch; and the switch comprises:

(1) a switch interface for each port unit for transmitting and receiving data signals in the internal format to and from the corresponding port unit; and (2) a switching fabric for receiving data signals in the internal format from the switch interfaces, routing the data signals, and transmitting the routed data signals back to appropriate switch interfaces.

4. A switching system for communication networks, comprising:

(a) a network-independent switch; and (b) a plurality of network-dependent port units connected to the switch, wherein each port unit is adapted to be configured to a corresponding communication network, such that:

each port unit receives data signals from its corresponding communication network conforming to a transmission protocol of the corresponding communication network, terminates at least some overhead data in the data signals, and re-formats the data signals into an internal format for transmission to and routing by the switch, wherein the internal format has one or more fields corresponding to terminated overhead data for storing payload data;

each port unit receives routed data signals from the switch in the internal format and re-formats the routed data signals for transmission to the corresponding communication network; and the internal format corresponds to a SONET frame format, except that one or more fields corresponding to overhead data in the SONET frame format are used for payload data in the internal format.

5. The invention of claim 4, wherein the internal format is adapted to store a greater number of complete 53-byte data packets of payload data than the SONET frame format.

6. The invention of claim 4, wherein the internal format corresponds to a matrix having 9 rows and M columns, wherein the first N columns are used for both overhead data and payload data and the last M–N columns are used for payload data.

7. The invention of claim 6, wherein:

at least one field in the first N columns is used as a pointer to identify the number of idle cells of null data before a first cell of real data; and at least one field in the first N columns is user-definable.

8. A switching system for communication networks, comprising:

(a) a network-independent switch; and.

(b) a plurality of network-dependent port units connected to the switch, wherein each port unit is adapted to be configured to a corresponding communication network, such that:

each port unit receives data signals from its corresponding communication network conforming to a transmission protocol of the corresponding communication network, terminates at least some overhead data in the data signals, and re-formats the data signals into an internal format for transmission to and routing by the switch, wherein the internal format has one or more fields corresponding to terminated overhead data for storing payload data;

each port unit receives routed data signals from the switch in the internal format and re-formats the routed data signals for transmission to the corresponding communication network; and the switching system is configurable to function as a switch node internal to a communication network, in which case all of the port units are configured to handle data signals corresponding to a single transmission protocol; and the switching system is configurable to function as an interface between two or more different communication networks conforming to two or more different transmission protocols, in which case each port unit is configured to handle data signals corresponding to the transmission protocol of its corresponding communication network.

9. A switching system for communication networks, comprising:

(a) a network-independent switch; and (b) a plurality of network-dependent port units connected to the switch, wherein each port unit is adapted to be configured to a corresponding communication network, such that:

each port unit receives data signals from its corresponding communication network conforming to a transmission protocol of the corresponding communication network, terminates at least some overhead data in the data signals, and re-formats the data signals into an internal format for transmission to and routing by the switch, wherein the internal format has one or more fields corresponding to terminated overhead data for storing payload data;

each port unit receives routed data signals from the switch in the internal format and re-formats the routed data signals for transmission to the corresponding communication network;

each port unit comprises:
(1) a network-dependent interface adapted to be configured to the corresponding communication network to convert between data signals conforming to the transmission protocol of the corresponding communication network and data signals in the internal format; and
(2) a port unit interface for transmitting and receiving data signals in the internal format to and from the switch; and the switch comprises:
(1) a switch interface for each port unit for transmitting and receiving data signals in the internal format to and from the corresponding port unit; and
(2) a switching fabric for receiving data signals in the internal format from the switch interfaces, routing the data signals, and transmitting the routed data signals back to appropriate switch interfaces.

10. A method for routing data signals in communication networks, comprising the steps of:
(a) receiving data signals from two or more communication networks, each communication network conforming to a transmission protocol;
(b) terminating at least some overhead data in the data signals;
(c) re-formatting the data signals into an internal format, wherein the internal format has one or more fields corresponding to terminated overhead data for storing payload data;
(d) routing the data signals in the internal format; and
(e) re-formatting the routed data signals for transmission to the communication networks, wherein each communication network is independent of every other communication network.

11. The invention of claim 10, wherein:
a first communication network is a synchronous network and a second communication network is an asynchronous network, wherein the first communication network is a SONET network and the second communication network is an ATM network;
the internal format corresponds to a SONET frame format, except that one or more fields corresponding to overhead data in the SONET frame format are used for payload data in the internal format;
the internal format corresponds to a matrix having 9 rows and M columns, wherein:
the internal format is adapted to store a greater number of complete 53-byte data packets of payload data than the SONET frame format;
the first N columns are used for both overhead data and payload data and the last M–N columns are used for payload data;
at least one field in the first N columns is used as a pointer to identify the number of idle cells of null data before a first cell of real data; and
at least one field in the first N columns is user-definable.

12. A method for routing data signals in communication networks, comprising the steps of:

(a) receiving data signals from two or more communication networks, each communication network conforming to a transmission protocol;
(b) terminating at least some overhead data in the data signals;
(c) re-formatting the data signals into an internal format, wherein the internal format has one or more fields corresponding to terminated overhead data for storing payload data;
(d) routing the data signals in the internal format; and
(e) re-formatting the routed data signals for transmission to the communication networks, wherein the internal format corresponds to a SONET frame format, except that one or more fields corresponding to overhead data in the SONET frame format are used for payload data in the internal format.

13. The invention of claim 12, wherein the internal format is adapted to store a greater number of complete 53-byte data packets of payload data than the SONET frame format.

14. The invention of claim 12, wherein the internal format corresponds to a matrix having 9 rows and M columns, wherein the first N columns are used for both overhead data and payload data and the last M–N columns are used for payload data.

15. The invention of claim 14, wherein:
at least one field in the first N columns is used as a pointer to identify the number of idle cells of null data before a first cell of real data; and
at least one field in the first N columns is user-definable.

16. An apparatus for routing data signals in communication networks, comprising:
(a) means for receiving data signals from two or more communication networks, each communication network conforming to a transmission protocol;
(b) means for terminating at least some overhead data in the data signals;
(c) means for re-formatting the data signals into an internal format, wherein the internal format relies on fields corresponding to terminated overhead data for storing payload data;
(d) means for routing the data signals in the internal format; and
(e) means for re-formatting the routed data signals for transmission to the communication networks, wherein each communication network is independent of every other communication network.

17. The invention of claim 16, wherein:
a first communication network is a synchronous network and a second communication network is an asynchronous network, wherein the first communication network is a SONET network and the second communication network is an ATM network;
the internal format corresponds to a SONET frame format, except that one or more fields corresponding to overhead data in the SONET frame format are used for payload data in the internal format;
the internal format corresponds to a matrix having 9 rows and M columns, wherein:
the internal format is adapted to store a greater number of complete 53-byte data packets of payload data than the SONET frame format;
the first N columns are used for both overhead data and payload data and the last M–N columns are used for payload data;
at least one field in the first N columns is used as a pointer to identify the number of idle cells of null data before a first cell of real data; and at least one field in the first N columns is user-definable.

18. An apparatus for routing data signals in communication networks, comprising:
(a) means for receiving data signals from two or more communication networks, each communication network conforming to a transmission protocol;
(b) means for terminating at least some overhead data in the data signals;
(c) means for re-formatting the data signals into an internal format, wherein the internal format relies on fields corresponding to terminated overhead data for storing payload data;
(d) means for routing the data signals in the internal format; and
(e) means for reformatting the routed data signals for transmission to the communication networks, wherein the internal format corresponds to a SONET frame format, except that one or more fields corresponding to overhead data in the SONET frame format are used for payload data in the internal format.

19. The invention of claim 18, wherein the internal format is adapted to store a greater number of complete 53-byte data packets of payload data than the SONET frame format.

20. The invention of claim 18, wherein the internal format corresponds to a matrix having 9 rows and M columns, wherein the first N columns are used for both overhead data and payload data and the last M–N columns are used for payload data.

21. The invention of claim 20, wherein:
at least one field in the first N columns is used as a pointer to identify the number of idle cells of null data before a first cell of real data; and
at least one field in the first N columns is user-definable.

* * * * *